United States Patent [19]
Duce

[11] Patent Number: 5,238,265
[45] Date of Patent: Aug. 24, 1993

[54] ADJUSTABLE RESTRAINER FOR USE WITH LAP BAR ASSEMBLIES OF AMUSEMENT RIDES

[75] Inventor: Mack D. Duce, Dallas, Tex.

[73] Assignee: Duce International, Inc., Dallas, Tex.

[21] Appl. No.: 811,861

[22] Filed: Dec. 23, 1991

[51] Int. Cl.⁵ .................................... B60R 21/04
[52] U.S. Cl. ........................... 280/751; 297/48
[58] Field of Search .............. 280/751, 745, 753; 297/30, 47, 48, 40, 41, 487, 488; 104/241

[56] References Cited

U.S. PATENT DOCUMENTS

| | | | |
|---|---|---|---|
| 2,592,879 | 4/1952 | Eyerly | 280/748 |
| 4,685,688 | 8/1987 | Edwards | 280/30 |
| 4,986,600 | 1/1991 | Leblanc et al. | 297/488 |

FOREIGN PATENT DOCUMENTS 2301270  7/1974  Fed. Rep. of Germany ...... 280/751

Primary Examiner—Richard M. Camby
Attorney, Agent, or Firm—Oblon, Spivak, McClelland, Maier & Neustadt

[57] ABSTRACT

An adjustable restrainer for use on the cross bar of an amusement ride lap bar assembly consists of a padded roller having an axis of rotation offset maximum and minimum distances from different parts of the roller. The roller can be rotated to adjust the spacing between the roller and a seat of the ride to suit the size of the rider thereby minimizing possible injury to the rider were he otherwise to be slammed over a substantial distance into the cross bar.

7 Claims, 2 Drawing Sheets

ADJUSTABLE RESTRAINER FOR USE WITH LAP BAR ASSEMBLIES OF AMUSEMENT RIDES

FIELD OF THE INVENTION

This invention relates to amusement rides and more particularly to an adjustable restrainer for use on lap bars of an amusement ride.

BACKGROUND OF THE INVENTION

Almost every amusement ride of the type in which riders are seated in a normal position on seats is provided with a lap bar assembly, including a cross bar, hinged at one end and designed to be latched with the cross bar extedning across the seat and spaced a substantial distance from the rider. Though an unpadded lap bar is acceptable for some rides, e.g. ferris wheels, a wide spacing between the bar and rider can lead to injury when the rider is propelled against the bar upon a sudden stop of a car, such as a bumper car, in which the rider is seated. Heretofore some lap bars have been provided with padded covers or rollers but these have been symmetrically mounted on the lap bars and do not take into account the wide variations in size of riders whereby a slight person can still be propelled against the padding over a relatively wide distance with sufficient force to cause injury.

BRIEF DESCRIPTION OF THE INVENTION

The broad object of the present invention is to provide padding or a padded roller or a roller of foamed yielding plastic having an axis of rotation which is offset with respect to first and second parts on the exterior of the roller, the first part being spaced a maximum distance for the axis of rotation and the second part being spaced a minimum distance, the two parts being joined together by a smooth convex curve. Thus when the roller is rotatably mounted on the cross bar of a bar assembly and rotated to a position where the first part faces the seat, the spacing between the roller and the seat is least for protection of a small rider, and when the roller is rotated to a position where the second part faces the seat, the spacing between the roller and the seat is greatest for protection of a large rider. The roller can be rotated to any position in between these points to accommodate a rider of almost any size.

Other objects and their attendant advantages will become apparent as the following detailed description is read in conjunction with the accompanying drawings wherein:

DETAILED DESCRIPTION OF THE INVENTION

Figure 1:
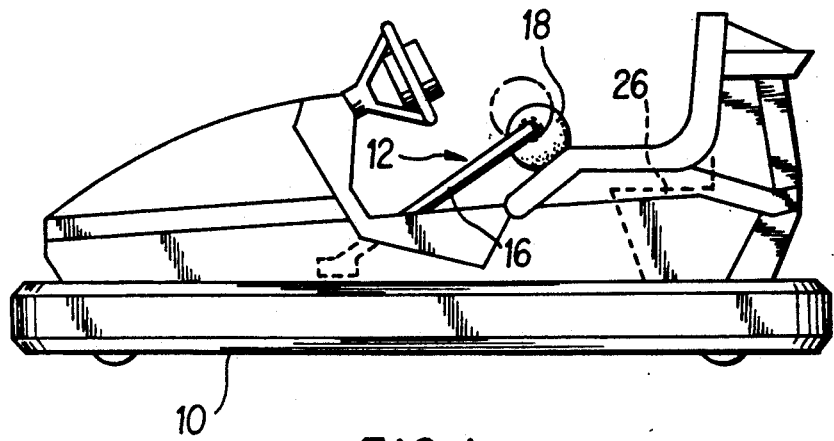
FIG. 1 is an elevational view of a typical bumper car showing the invention.

Referring now to the drawings the numeral 10 in FIG. 1 designates a typical bumper car designed for two riders one of whom controls the car. The car is equipped with a lap bar assembly 12, which, in this case, is of inverted U-shape and better shown in FIG. 3 as comprising a cross bar 14 extending between a pair of legs 16 pivoted at their lower ends and cooperating with latch means (not shown) whereby the bar may be releasably locked in its safety position of FIG. 1 wherein the cross bar 14 is normally spaced a substantial distance from a seat 26 and which may be as much as a foot for a small rider.

In order to protect riders from being slammed against an unprotected cross bar the present invention provides for mounting on the cross bar 14 one or more padded rollers 18 depending on the number of seated riders Because the car 10 is designed to carry two riders a second roller 20 is rotatably mounted on the cross bar 14. Each of the rollers 18, 20 is constructed that its axis of rotation A—A, FIG. 3, is offset from one part, say part 22, of the exterior surface of a roller 18 or 20 a greater distance than from a second part 24 of the roller. The parts 22 and 24 are spaced a maximum and minimum distance, respectively from the axis of rotation A—A and because the rollers 18 and 20 are circular in cross-section the first and second parts 22 and 24 are diametrically opposite each other as should be clear in FIG. 2. The arrangement is such that when a roller 18 or 20 is mounted on a lap bar and rotated so that its first part 22 faces a seat, indicated by the dashed line 26 in FIGS. 2 and 3, the spacing, indicated by the double ended arrows 28 in FIGS. 2 and 3, between the roller 20 and the seat is least. On the other hand, when a roller is rotated so that its part 24 faces the seat 26 the spacing between the roller and seat is greatest as indicated by the double ended arrow 30 in FIG. 3.

Figure 2:
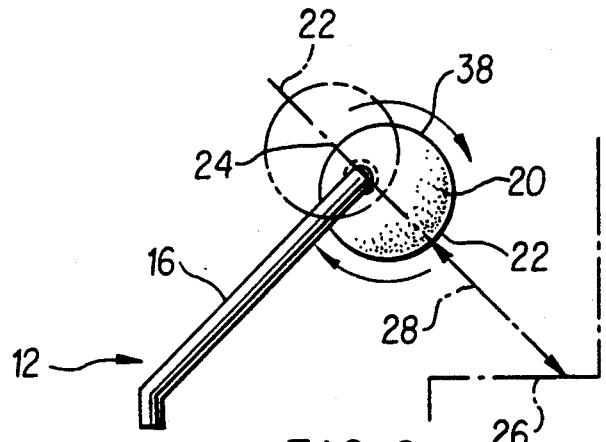
FIG. 2 is an enlarged broken side elevational view of a lap bar illustrating the invention.
Figure 3:
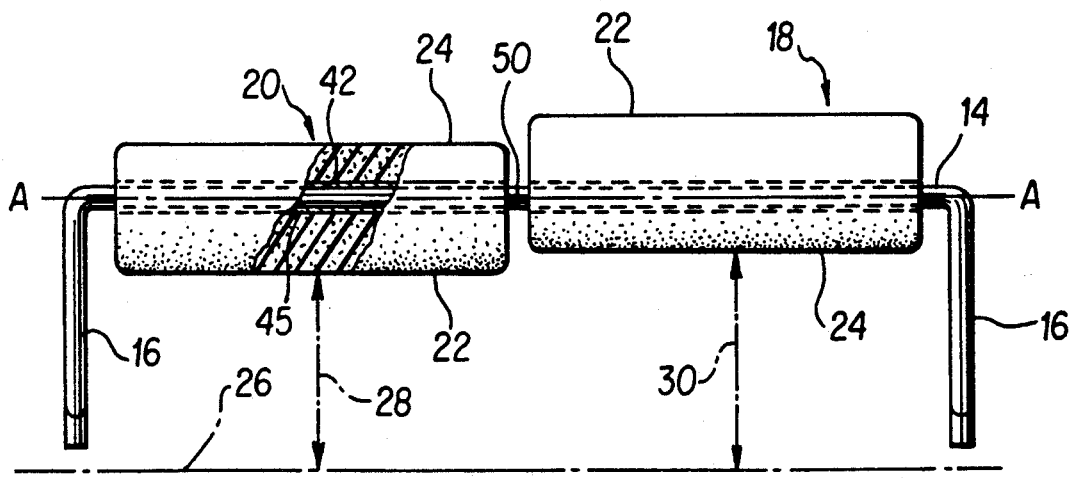
FIG. 3 is a front elevational view of a pair of rollers respectively rotated to minimum and maximum spacing between a seat and the rollers.
Figure 6:
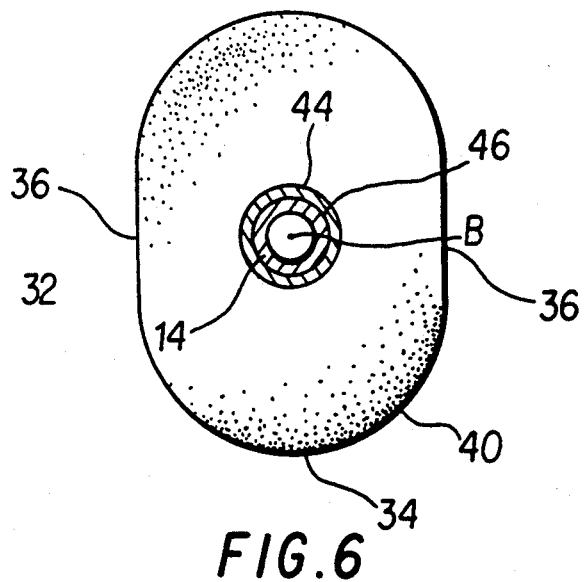
FIG. 6 illustrates a second embodiment of the invention.

The rollers shown in FIGS. 1-3 define elongated cylinders The rollers need not be circular in cross-section but could be substantially elliptical as shown at 32 in FIG. 6. In FIG. 6 the first part which is a maximum distance from the axis of rotation B is at 34 and the second part which is at a minimum distance is at 36. With this arrangement the geometric and rotational axes are the same.

In both the circular and elliptical embodiments the first and second parts 22, 24 and 34, 36, respectively, are joined together by smooth convex curves 38 and 40, respectively, and which circumscribe their axes of rotation whereby the rollers may be rotated to any intermediate position suited to the size of a particular rider.

For mounting on a cross bar, each roller has a longitudinal passage coincident with its axis of rotation. The passages 42 in the cylindrical rollers of FIG. 3 or the passage 44 in the elliptical roller of FIG. 6 may be unbroken around their internal circumferences with the passages having diameters whereby they have a frictional interference fit with the cross bars. Desirably the passages have diameters greater than the cross bars and have adhered or otherwise bonded to their interior surfaces pipes 45, 46 as shown in FIGS. 3 and 6, respectively. The pipes are of suitable wear resistant material, preferably plastic, and have internal diameters having frictional interference fits with the cross bars. Though frictional interference fits too are preferred for retaining the rollers in their adjusted positions any other suitable means for accomplishing the same purpose are contemplated as falling within the purview of the invention.

The rollers can be applied to the cross bars at the time of manufacture of, if applied later, it is a simple matter to cut a cross bar at its center 50 as shown in FIG. 3, move the two parts of the cut cross bar out of alignment with each other, slide on the rollers and thereafter weld the two parts back together.

Figure 4:
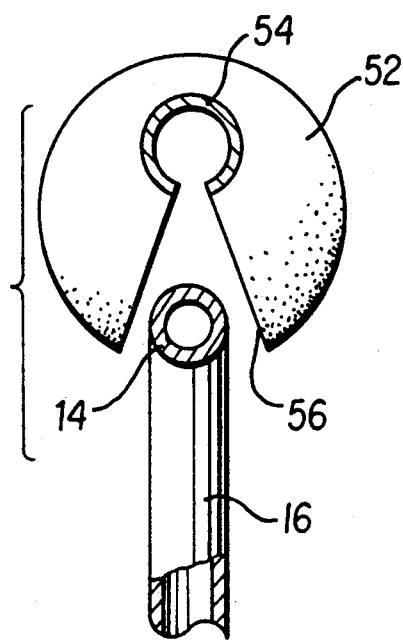
FIG. 4 illustrates one arrangement for assembling a roller of the invention on the cross bar portion of an in situ inverted U-shaped lap bar.
Figure 5:
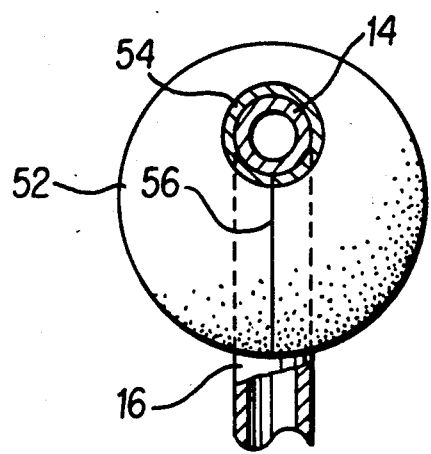
FIG. 5 illustrates the completed assembly of the arrangement of FIG. 4.

FIG. 4 shows an alternative arrangement where a roller 52 and its pipe 54 are longitudinally slit as at 56 and spread for forcing over the cross bar 14. After the pipe 54 has been snapped over the bar 14, the sides of the slit 56 are bonded together as shown in FIG. 5.

It is believed the use of the invention should be apparent from the foregoing description. Normally at the completion of a ride an attendant releases the lap bar and at the same time rotates the roller so that its minimum dimension faces the seat as shown by the dotted lines in FIG. 2. When the next rider is seated, the attendant moves the bar to its latched position and rotates the roller to an optimum position suited to the size of the rider. Where the rider can be expected to grasp the cross bar during the ride, the length of a roller can be dimensioned as necessary to provide sufficient space on the cross bar at each end of the roller for the riders hands.

It should be apparent that the invention is susceptible of a wide variety of modifications without, however, departing from the scope and spirit of the appended claims:

I claim:

1. A restrainer for use on a lap bar of an amusement ride having seat for at least one rider comprising padded roller means having an axis of rotation, means for rotatably mounting said roller means on a lap bar coincident with its axis of rotation, said roller means being constructed that its axis of rotation is offset from a first part of the exterior of said roller means a greater distance than a second part such that when said roller means is mounted on a lap bar and rotated so that said first part faces said seat, the spacing between said roller means and said seat is least and when said roller means is rotated so that said second part faces said seat the spacing between said second part and said seat is greatest.

2. The restrainer of claim 1 wherein said first and second parts are joined by a smooth convex curve.

3. The restrainer of claim 2 wherein said curve circumscribes said axis of rotation.

4. The restrainer of claim 3 wherein said roller means is circular in cross section and of substantially cylindrical shape, said axis of rotation being offset from but parallel to the geometric axis of said substantially cylindrical shape.

5. The restrainer of claim 3 wherein said roller means is substantially elliptical in cross section and its geometric and rotational axes are the same.

6. The restrainer of claim 1, in combination with a lap bar assembly, including a cross bar, wherein the means for rotatably mounting said roller means on said cross bar comprises a passage through said roller means coincident with its axis of rotation and means cooperating with said passage and said cross bar for releasably retaining said roller means in any selected position to which said roller means is rotated with respect to said cross bar.

7. The restrainer of claim 6 wherein said releasable retaining means comprises a pipe adhered to the internal surface of said passage means, said pipe having a frictional interference fit with said cross bar.

* * * * *